Nov. 9, 1954  H. S. KINDLER  2,693,917
MEASURING APPARATUS CHART ADVANCING AND REROLL MECHANISM
Filed March 3, 1951  3 Sheets-Sheet 1
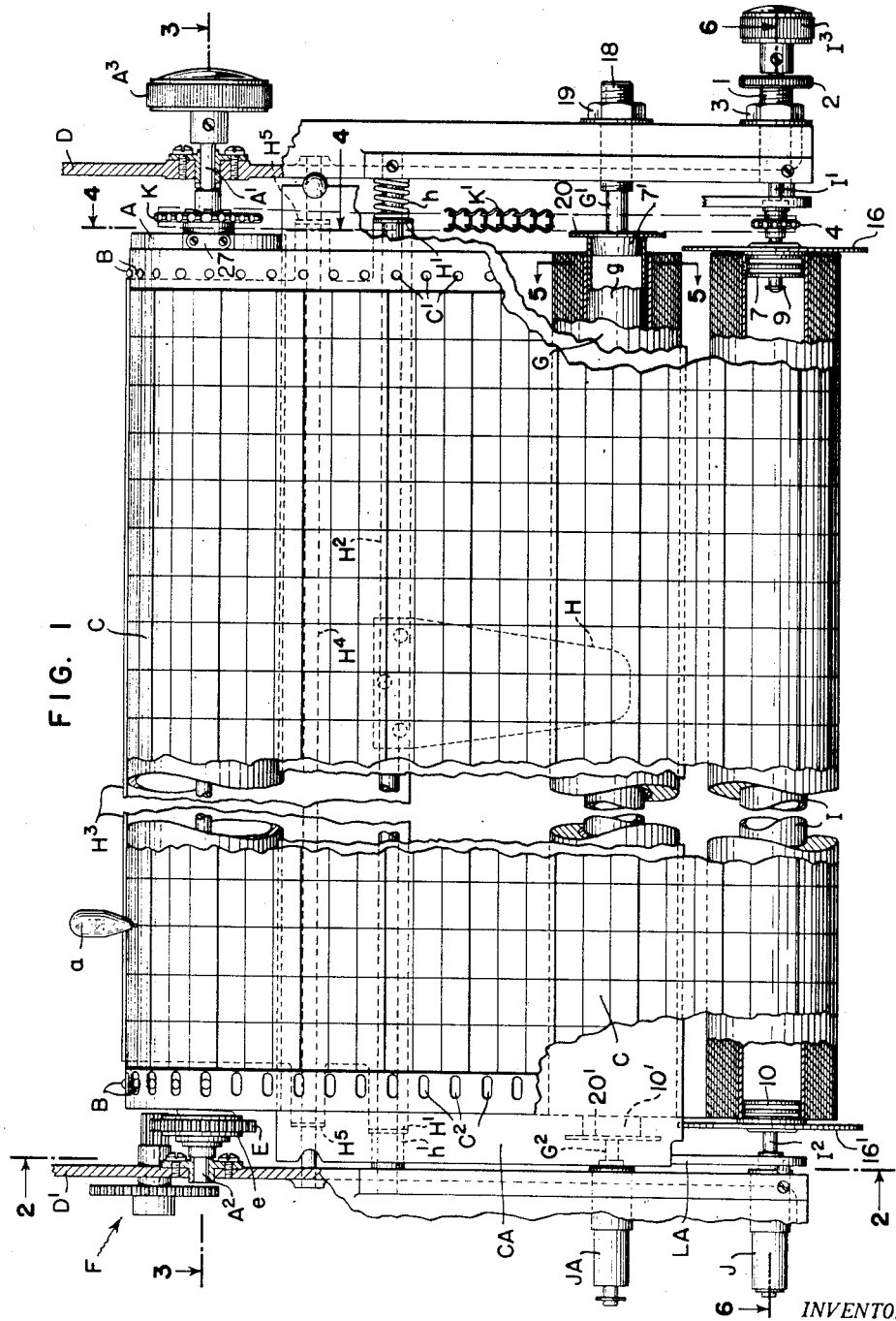
INVENTOR.
HERBERT S. KINDLER
BY Arthur H. Swanson
ATTORNEY.

Nov. 9, 1954            H. S. KINDLER            2,693,917
MEASURING APPARATUS CHART ADVANCING AND REROLL MECHANISM
Filed March 3, 1951            3 Sheets-Sheet 2
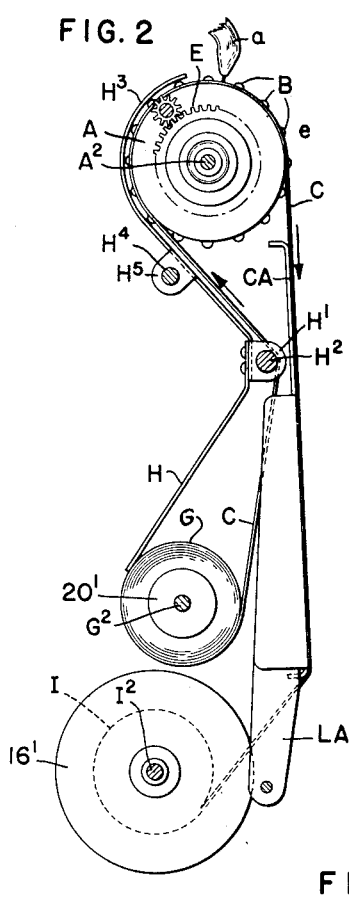
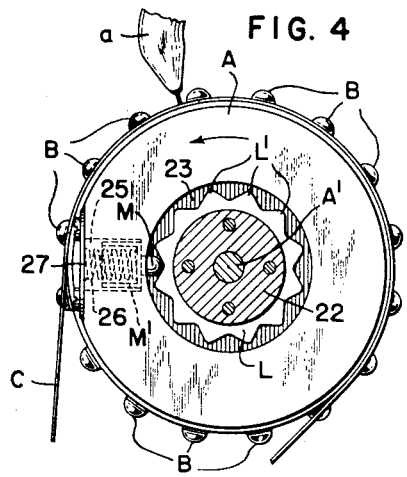
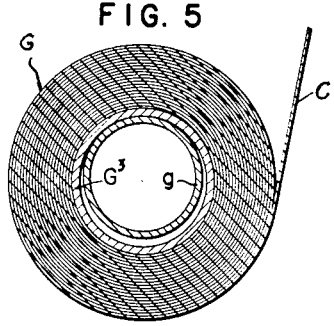
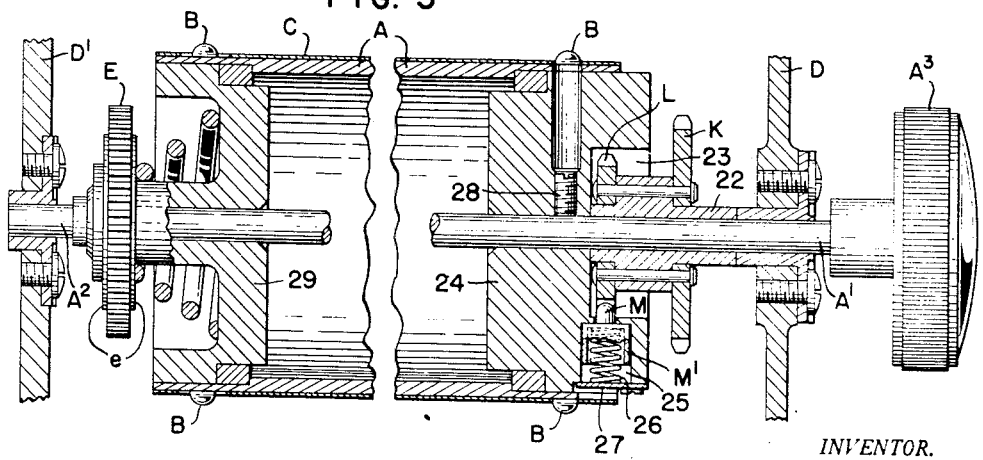
*INVENTOR.*
HERBERT S KINDLER
BY Arthur H. Swanson
ATTORNEY.

Nov. 9, 1954
H. S. KINDLER
2,693,917
MEASURING APPARATUS CHART ADVANCING AND REROLL MECHANISM
Filed March 3, 1951
3 Sheets-Sheet 3
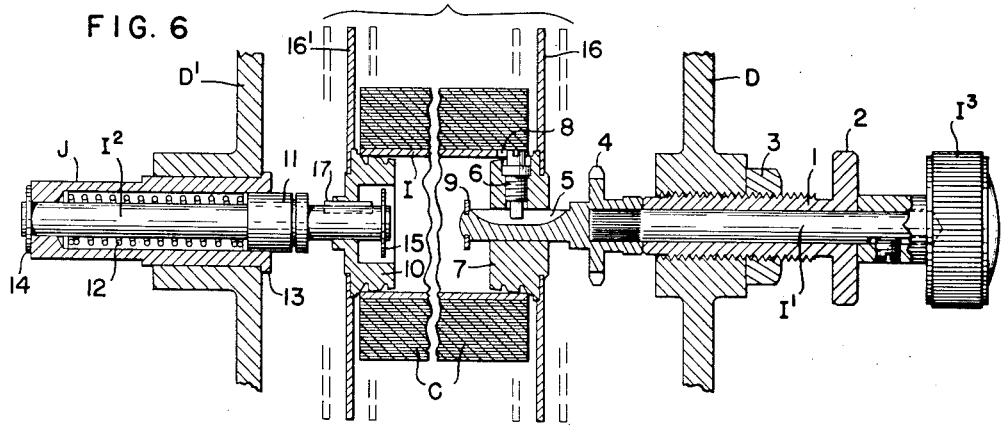
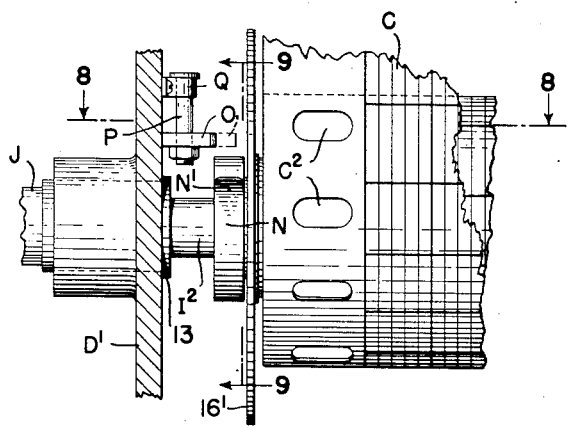
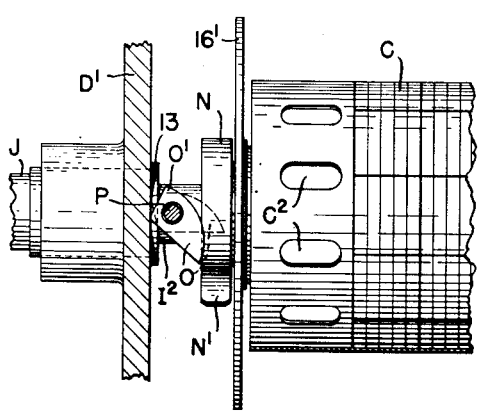
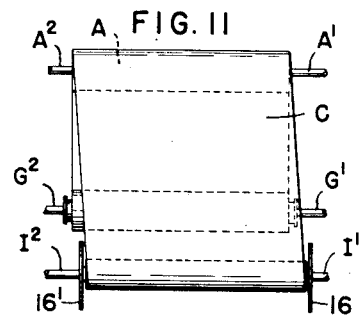
INVENTOR.
HERBERT S KINDLER
BY Arthur H. Swanson
ATTORNEY.

United States Patent Office 2,693,917
Patented Nov. 9, 1954

2,693,917

MEASURING APPARATUS CHART ADVANCING AND REROLL MECHANISM

Herbert S. Kindler, Philadelphia, Pa., assignor to Minneapolis-Honeywell Regulator Company, Minneapolis, Minn., a corporation of Delaware Application March 3, 1951, Serial No. 213,719

5 Claims. (Cl. 242—55)

The general object of my invention is to provide an improved strip chart advancing or feeding mechanism, primarily devised for use in measuring and recording instruments. Heretofore, it has been common practice to provide such instruments with a strip chart advancing mechanism which comprises a supply roll, a reroll, and a rotating chart drum which draws the strip chart material from the supply roll and passes it to the reroll, and which also comprises means for causing the supply roll and reroll to subject the chart material passing over the drum to opposing tension forces which keep the material taut.

To keep the portion of the chart between the chart drum and the supply roll and reroll suitably taut, it has been the regular practice to continuously subject the supply roll to a retarding force, and to continuously subject the reroll to a chart strip advancing force so that the effective advancing force which the drum impresses on the chart strip is supplemented by the advancing force which the reroll impresses on the portion of the chart between the reroll and the drum, and is diminished by the tension in the portion of the chart strip between the drum and the supply roll.

The advancing force to which the chart is subjected by the chart drum may be wholly due to drum and chart contact friction. Ordinarily, however, it is due in part to contact friction but more largely to radial pins or projections carried by the drum and each of which moves into and then out of a corresponding chart perforation as the strip moves over the drum. The perforations are customarily arranged in two rows, one row adjacent each side edge of the strip.

Heretofore, it has been considered desirable to have the supply roll and the reroll maintain opposing tension forces which are approximately constant in magnitudes, and to that end various arrangements have been devised for regulating the opposing chart tensions of the supply roll and reroll. To simplify the references thereto, the tension in the portion of the chart between the supply roll and chart drum is ordinarily referred to hereinafter as the supply tension, and the tension in the portion of the chart passing from said drum to the reroll is ordinarily referred to hereinafter as the reroll tension. The tension regulating means heretofore employed have not been entirely satisfactory due to a variety of causes including, in particular, the inversely varying diameters of the supply roll and reroll, irregularities in the chart strip material and irregularities in the operation of the means employed to regulate the retarding and advancing forces respectively impressed on the supply roll and the reroll. In consequence, the strip chart material used in a recording instrument has been subjected, at times, to forces tending to move the chart material in a direction parallel to the axis of the chart drum with the result that the chart strip may be caused to buckle and tear and may be pulled off the advancing pins carried by the chart drum.

A primary object of the present invention is to provide chart advancing mechanism wholly or largely free from any tendency to move the chart strip laterally off the chart engaging pins or projections carried by the chart drum. That tendency develops from time to time in the operation of instruments now in general use. Ordinarily the chart is pulled off of the chart driving pins as a result of chart conditions which cause the chart material being wound on the reroll to be longitudinally displaced relative to the chart drum and which also cause the reroll tension to become abnormally high.

A specific but practically important object of the present invention is to provide supporting means for the supply roll and for the reroll which will permit each of those rolls to "float" i. e. to move longitudinally, relative to the chart drum, in response to tension conditions tending to longitudinally displace the chart material which is being wound on the reroll.

Another important object of the invention is to provide means operating automatically to temporarily eliminate or substantially reduce the reroll tension whenever that tension builds up to a predetermined maximum value which is somewhat smaller than the tension required to pull the chart off the chart drum pins. Thereafter the reroll tension is permitted to again build up more or less gradually to its said maximum value. The substantial elimination at relatively frequent intervals, of the reroll tension, permits of a chart resetting action at each such interval which temporarily eliminates, or reduces, a previously existing tendency of the chart strip to move in a direction parallel to the axis of the drum.

Another important object of the invention is to provide means normally operative to oppose rotation of the reroll in the direction required to unwind chart material previously wound on that roll, but adapted to yield to permit such rotation when an examination is desired of a portion of the chart previously wound up on the reroll. To this end I provide resilient means which does not prevent the rotation of the reroll in the direction to unwind more or less of the chart material previously wound on the reroll, but which builds up a resilient return tension force as the reroll is being turned in the unwinding direction and which automatically turns the reroll in its normal winding direction to rewind much, at least, of the chart material previously unwound from the reroll, as soon as the latter is no longer held against movement in the last mentioned direction.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive manner in which I have illustrated and described a preferred embodiment of the invention.

Of the drawings:

Fig. 1 is an elevation with parts broken away and in section, of an instrument of a known general type in which my novel chart advancing mechanism is incorporated;

Fig. 2 is an elevation of a portion of the apparatus, in section on the line 2—2 of Fig. 1;

Fig. 3 is a chart drum plan section on the line 3—3 of Fig. 1;

Fig. 4 is a section through the chart drum taken on the line 4—4 of Fig. 1;

Fig. 5 is a section through the supply roll and associated tension spring, taken on the line 5—5 of Fig. 1;

Fig. 6 is a plan section through the reroll, taken on the line 6—6 of Fig. 1;

Fig. 7 is an elevation with parts broken away and in section illustrating a modification of, or addition to, a portion of the reroll shown in section in Fig. 6;

Fig. 8 is a partial plan section on the line 8—8 of Fig. 7;

Fig. 9 is an elevation in section on the line 9—9 of Fig. 7;

Fig. 10 is a diagrammatic elevation illustrating an objectionable action resulting from an unequal distribution of the tension force in different side-by-side portions of the chart strip passing to the reroll; and Fig. 11 is a diagrammatic elevation illustrating an objectionable condition developing when the chart material on the reroll is displaced longitudinally from the chart material passing over the chart drum and wound on the supply roll.

In the drawings I have illustrated by way of example, the use of my novel chart advancing mechanism in a recording instrument which is of a known type comprising a chart drum A normally rotated at at predetermined constant speed. As shown, the drum A is provided adjacent each end with a circular row of radial pins or projections B, each adapted to extend through a corresponding perforation $C^1$ or $C^2$ formed in side edge portions of the chart strip C. As shown, the perforations $C^1$ in the right edge portion of the chart strip C shown in Fig. 1 are round, and each is of a diameter to snugly receive the cylindrical base portion of a pin or projection B. The chart strip perforations $C^2$ are elongated in a direction transverse to the length of the chart strip to accommodate variations in the chart strip width, such as may result from changes in atmospheric conditions. A pen $a$ traces a record in conventional manner on the chart strip C as the latter is moved over the drum A.

The chart drum A comprises shaft end portions $A^1$ and $A^2$, which are respectively journalled in side frame portions D and $D^1$ of the instrument framework, or chassis. As shown, the portion $A^2$ carries a spur gear E through which the chart drum is rotated by means including a gear train F and the usual chart motor, not shown. Customarily and as shown, the gear E is connected to the shaft end portion $A^2$ by friction clutch means $e$ normally effective to prevent relative angular movement of the drum A and gear E, but yielding to permit the drum A to be rotated by manual adjustment of a knob $A^3$, shown as connected to the shaft end portion $A^1$.

In normal operation the drum A is in continuous rotation and draws strip chart material C at a predetermined speed from a supply roll G. The latter is supported by spindle elements $G^1$ and $G^2$ mounted in the side frame D and $D^1$, respectively. The supply roll speed may vary with conditions of use as for example, between one inch and 480 inches per hour although lower or higher speeds may be provided, if desired. The elements $G^1$ and $G^2$ are further described hereinafter. As diagrammatically shown, the supply roll G is subjected by a loading or braking spring H to a retarding force which opposes the rotation of the supply roll and impresses a supply tension on the strip chart portion between the supply roll G and the chart drum A. The spring H may be, and as shown, is attached to and supported by a chart guide plate $H^3$ having projecting portions or ears $H^1$ at each end. The ears $H^1$ are supported by a rod $H^2$, the ends of which are rigidly anchored in the side frames D and $D^1$. A helical compression spring $h$ surrounds the right end portion of the rod $H^2$ as seen in Fig. 1 and a spacer $H^1$ is provided at the left end of the rod $H^2$ for holding the projecting portion or ear $H^1$ in the position shown. The chart guide plate $H^3$ and spring H are rigidly attached to each other and are restrained from angular movement in the clockwise direction as seen in Fig. 2 by another rod $H^4$ the ends of which extend through ears $H^5$ at each end of the plate $H^3$. The rod $H^4$ is rigidly anchored in the side frames D and $D^1$. Thus, the spring H is maintained at a predetermined pressure in engagement with the chart material wound on the supply roll.

The ears $H^1$ and $H^5$ also serve as positioning elements for the chart guide plate $H^3$ and maintain the latter in suitable position with respect to the instrument frame work. The chart material drawn from the supply roll G by the chart drum A is passed to and wound on a take-up roll or reroll I. As chart material is drawn away from the chart drum A by the reroll I it passes over the usual supporting platen CA customarily provided to serve as a guide for the chart material moving over it and to facilitate inspection of the record formed on the chart material by a recording element diagrammatically shown as a recording pen $a$.

The reroll I is supported by spindle elements $I^1$ and $I^2$ mounted in the side frames D and $D^1$, respectively. The element I is a spindle journalled for rotative movement in a sleeve 1, as seen in Fig. 6. The latter is externally threaded and extends through a threaded opening formed in the wall D. The sleeve 1 is provided at its outer end with a knob portion 2 by means of which the sleeve 1 can be rotated to thereby adjust the spindle element $I^1$ longitudinally provided a lock nut 3 threaded on the sleeve 1 and normally clamped against the side frame D, is backed off to permit such adjustment. Normally the nut 3 is in locking engagement with the side frame D and rigidly secures the sleeve 1 to the latter. The spindle element $I^1$ carries a knob $I^3$ at its outer end through which the spindle $I^1$ may be manually rotated.

In regular operation, the reroll is rotated by the chart drum through a sprocket chain $K^1$ intermittently advanced by the chart drum, as hereinafter explained, and running over a sprocket wheel 4 carried by the spindle $I^1$. The inner end of the spindle $I^1$ is formed with a slot 5 receiving one end of a pin 6 which extends radially away from the axis of the spindle $I^1$ and has a body portion externally threaded and received in a threaded radial passage formed in a tapered plug 7. The latter normally extends to and is anchored in the corresponding end of a fibre tube I which forms the body portion of the reroll. The tube I is formed with a slot or notch 8 at its end adjacent the wall D to receive the outer end of the pin 6. The latter thus serves to prevent rotation of the spindle $I^1$ relative to the plug 7, and to prevent rotation of the latter relative to the tube I. As shown, a stop element 9 is riveted to the inner end of the spindle $I^1$. The member 9 projects radially away from the periphery of the element $I^1$ and prevents the latter from being drawn out of the axial passage in the plug 7 normally receiving the spindle $I^1$, so long as the member 9 is attached to said spindle.

The spindle element $I^2$ extends through an axial opening in, and forms a trunnion like support for a tapered plug 10. The latter normally extends into and is anchored in the adjacent end of the tube I and thus connects the element $I^2$ to the tube. Intermediate its ends, the spindle element $I^2$ is provided with a cylindrical enlargement 11 which may be in the form of a sleeve attached to, or may be an integral portion of the spindle element. The part 11 serves as a spring abutment engaging one end of a helical spring 12 surrounding the outer portion of the element $I^2$ and received in a spring housing member J. The latter extends through, and is mounted in a hollow boss or bearing portion of the side frame $D^1$. The housing J has an annular outer end portion forming an abutment for the outer end portion of the spindle $I^2$. The member J is formed at its inner end with a peripheral flange 13 which normally engages the inner side of the frame member $D^1$ at the margin of the opening therein through which the member J extends.

The outer end of the element $I^2$ has detachably connected thereto, a stop element 14 shown as a disc extending radially outward from the spindle element $I^2$ and preventing the latter from being pulled through the opening in the outer end of the member J.

The inner end of the element $I^2$ has detachably connected to it, a stop element or disc 15 which projects radially away from the periphery of the element $I^2$ and prevents the latter from being pulled outwardly through the axial opening in the plug 10 receiving the inner end of the spindle element $I^2$. As shown, a coaxial apertured disc 16 is attached to the plug 7, and serves as a spool flange at the end of the reroll I adjacent the wall D. Similarly, an apertured disc $16^1$ is attached to the plug 10 and forms a spool flange at the end of the reroll I adjacent the side frame $D^1$.

For the normal use of the apparatus shown in Figs. 1 to 6, it is immaterial whether the spindle $I^2$ does or does not share the rotative movements with the reroll I. However, for the use of the automatic rewinding mechanism associated with the spindle $I^2$ as shown in Figs. 7, 8, and 9 and hereinafter described, it is essential that the spindle should share the rotative movements of the reroll. To that end the spindle $I^2$ is shown in Fig. 6 as provided with a longitudinal rib 17 received in a groove formed in the wall of the passage through the disc 10 through which the spindle $I^2$ passes. The rib 17 and the groove in the disc 10 receiving that rib, form a conventional spline connection between the spindle $I^2$ and the reroll.

In the form shown in Fig. 5, the supply roll G comprises a tube or hollow body $G^3$ which loosely surrounds and is supported by a shaft shown as a tube $g$ having an external diameter smaller than the internal diameter of the supply roll tube $G^3$. The ends of the supporting tube $g$ receive and frictionally grip or are otherwise anchored in tapered plugs $7^1$ and $10^1$, as the tapered plugs 7 and 10 are anchored in the ends of the reroll tube I. The plug $7^1$ is secured to the end of the previously mentioned spindle element $G^1$. The latter has an enlarged, externally threaded body 18 which passes through and is in threaded engagement with the internally threaded wall of an opening in the frame D. Thus, by rotating the spindle $G^1$, the latter may be axially adjusted relative to the side frame D. A clamping nut 19 serves to normally hold the element $G^1$ in rigid engagement with the frame member D. The plug $10^1$ may be similar to the plug 10 associated with the reroll I, and may be supported by an element JA identical in form, and in its mounting, with the element J associated with the reroll I.

In accordance with the present invention, the continuous rotation of the drum A effects an intermittent rotation of the reroll I in the direction to draw the strip chart C away from the drum A, and to wind it up on the reroll I. As shown the drum A gives the reroll its intermittent rotation through a drive connection comprising a sprocket wheel K, a ratchet wheel L rigidly attached to the wheel K, the previously mentioned sprocket chain K¹ which runs over the sprocket wheel K and over the reroll sprocket wheel 4, and a pawl M through which the ratchet wheel L is yieldingly connected to the drum A for intermittent rotation by the latter. In the particular construction shown in Figs. 3 and 4, the sprocket wheel K and ratchet wheel L are each rigidly connected to a hub or sleeve 22 journalled on the portion of the shaft end portion A¹ between the drum A and side frame D. The ratchet wheel L is located in a recess 23 formed in the outer side of a disc, or drum end member 24 anchored in the end of the tubular body of the drum A adjacent the side frame D.

The pawl M comprises a tooth-like part normally extending radially into the space between two adjacent ratchet teeth L¹ of the wheel L, as shown in Fig. 4, and comprises a hollow cylindrical body part M¹ received in a radial guideway 25 formed in the portion of the disc 24 surrounding the recess 23. The pawl M is biased for movement toward the shaft end portion A¹ by a compression spring 26 interposed between the pawl and a removable closure 27 for the outer end of the guideway 25. As shown in Fig. 3, the disc 24 is anchored to the shaft end portion A¹ by a set screw 28 and the disc 29 at the opposite end of the chart drum may be formed and secured to the shaft end portion A¹ in conventional manner.

As shown in Fig. 4, each ratchet tooth L¹ has its sides oppositely inclined at an angle of 45° or so to a plane including the axis of the shaft end portion A¹ and extending through the tip of said tooth. As the reroll tension approaches its maximum permitted value, the pawl M is cammed radially away from the axis of the shaft end portion A¹ by the trailing side of the particular tooth L¹ then in engagement with and at the counter-clockwise side of the pawl M, as seen in Fig. 4. As soon as said tooth moves the pawl far enough away from the shaft portion A¹, the pawl snaps over the tooth, and the reroll tension then drops to zero.

The pawl M thus forms a means for causing the ratchet wheel L, and thereby the sprocket wheel K, to turn with the drum A when the resistance to the movement of the sprocket wheel K is below that due to the maximum reroll tension permitted. When that tension is attained, the ratchet wheel tooth L¹ then in front of and in engagement with the pawl M, moves the latter radially outward away from the shaft end portion A¹ until the pawl M is permitted to snap over the end of said tooth. This gives the ratchet wheel L a slight reverse rotative movement and temporarily eliminates the reroll tension. That tension does not begin to build up again until after the movement of the drum A and pawl M has given the ratchet wheel L a small movement in the counter-clockwise direction as seen in Fig. 4. Further movement of the drum A will then result in a similar movement of the ratchet wheel until the tension of the chart portion between the drum A and the reroll I again becomes great enough to cause the pawl to snap over the tooth L¹ previously in engagement with the pawl at the counter-clockwise side of the latter as seen in Fig. 4.

In accordance with the present invention, the apparatus is so proportioned and arranged that the maximum tension which can be impressed on the adjacent portion of the chart by the reroll I is less than the tension required to pull the chart off the projections B under the conditions in which the chart would be pulled off those projections if the chart tension were somewhat greater. In ordinary operation the chart is not pulled off of the chart drum pins or projections B by the reroll I, unless the chart material being wound on the reroll is displaced longitudinally of the latter from the portion of the chart in engagement with the projections B, and then only when the chart tension between the drum A and reroll I exceeds a determinable amount. In the case of a well known commercial recording instrument in which the strip chart is twelve inches wide, I have found that the minimum chart tension due to the reroll required to pull the chart off the projections B is about six and one half pounds. In such case, for the purposes of the present invention, the ratchet wheel K and pawl L are arranged to permit the rotation of the reroll I to be interrupted when the tension on the portion of the chart between the reroll I and drum A, rises to an amount which is substantialy less than six and one half pounds, and which may well be about four pounds.

When the rotation of the reroll I is interrupted and the tension of the chart between the drum A and reroll drops to zero, the chart strip is permitted to reset itself with the result of eliminating, or minimizing any existing tendency to longitudinal displacement on the reroll of the chart material being wound thereon.

The tendency of prior chart advancing mechanisms to subject the chart to a force parallel to the chart drum axis and great enough to pull the chart off the chart drum driving pins B may result from various causes, several of which will now be specified.

One such cause is chart strip crookedness. A chart strip sixty feet long sometimes departs from a straight line by as much as six inches. Such irregularity in the chart tends to cause a chart misalignment between the drum and reroll of approximately one sixteenth of an inch.

Another such cause is the inherently greater chart weakness at the side of the chart including the elongated perforations C², than at the opposite side, so that the portion of the chart including the elongated perforations is more apt to buckle under an applied force than is the portion of the chart including the circular holes. Such buckling tends to cause the chart to pass from the drum A to the reroll I at an angle to a plane transverse of the axes of the drum and reroll.

A third such cause is the change in width of the chart strip with changes in atmospheric conditions, and a resultant variation in the distance between the chart drum projections B and the edge of the chart strip adjacent the elongated chart perforations, and tends to produce a lateral displacement of the portion of the chart passing over the chart drum and the portion of the chart wound on the reroll.

A fourth cause may be the manufacturing tolerances necessarily allowed. Those tolerances may permit of a clearance between the driving pins B and the chart holes through which they pass, and may also permit eccentricity of the chart drum, and misalignment of the diametrically opposed chart drum pins B, and non-parallelism of the chart drum with the supply and reroll drums.

Further causes may be installation irregularities, which include the initial placement of the chart in the instrument in such manner as to produce misalignment of the paper between the drum A and the reroll corresponding in amount to the lateral distance through which a taut chart may move as it is being attached to the reroll tube, without producing a definite bulge large enough to be detected. Installation irregularities may also result in unbalance in the supply tension across the chart resulting from lack of equality between the spring pressure when applied, as has been customary heretofore, through two springs engaging the opposite side portions of the chart. Such unbalance in the supply tension may also result from lateral movement of the supply roll so that the two springs no longer retain their symmetrical positions relative to the roll.

Inequalities in the supply tension in different side-by-side portions of the chart strip due to the use of two retarding springs respectively engaging the supply roll adjacent its opposite ends as has been customary heretofore, may be substantially eliminated by the use of a single tension spring bearing against the central portion of the paper wound on the supply roll, coupled with freedom of the supply roll and the reroll to float, or move longitudinally relative to the other and to the chart drum, in response to conditions tending to produce such floating movements.

In general, without the necessary freedom for adequate floating movements of both the supply roll G and of the reroll I provided in accordance with the present invention, any of the irregularities mentioned above may be expected to produce an objectionable difference between the tensions of the chart material portions adjacent the two sides of the strip, on the development of either or both of the two undesirable conditions illustrated in Figs. 10 and 11. In Fig. 10, the operating condition is such that the side edges of the chart strip are parallel to planes transverse to the chart drum axes, but the reroll tension in the portion of the chart strip adjacent the right hand edge of the strip is greater than the reroll tension in the portion of the chart strip adjacent its left hand edge. Under the described condition, the chart material adjacent the right end edge of the chart strip will wind more tightly about the reroll I than will the chart material adjacent the left edge of the strip.

The resultant increase in the diameter of the loosely wound left end of the chart material on the supply roll will eventually increase the tension of the left edge portion of the chart strip passing to the reroll to, or above a value equal to or greater than that of the tension of the right edge portion of the chart strip. Ordinarily, however, that tension increase will not occur until after an undesirable non-uniform outside diameter of the material wound on the reroll has developed, and has caused the floating reroll to be shifted longitudinally to the left as indicated by the arrow in Fig. 10, so that the side edges of the chart strip portion passing to the reroll will then no longer be parallel to planes transverse to the chart drum axis.

The operating condition giving rise to the chart tension condition illustrated in Fig. 10 may be initiated in various ways, and, in particular, by any condition through which different supply tensions are established in different side-by-side portions of the chart strip passing from the supply roll to the chart drum. In general when the supply roll and the reroll are free to float as far as is desirable, the development of a small tension condition of the character illustrated in Fig. 10 will cause the reroll to move to the left and will cause a movement to the right of the supply roll. Under normal operating conditions only relatively small floating movements in opposite directions of the supply roll and reroll are needed to substantially equalize the tensions adjacent the opposite side edges of the chart strip. When the reroll tension is periodically interrupted as has been described, the supply roll and reroll ordinarily tend to move longitudinally into the respective positions in which the side edges of the chart strip are substantially parallel to planes transverse to the chart drum axis.

Thus in the normal use of the invention there is no tendency for a cumulative building up of inequalities in the tension of the two side edges of the strip such as exist when both rolls are not free to float. Without such freedom, any condition which causes chart material wound on a non-floating reroll to shift longitudinally on the roll and does not pull the chart off the pins B, will ordinarily result in a tendency of the material wound on the reroll to shift alternately in opposite directions. Each such movement of the chart material being wound on the reroll in the longitudinal direction of the latter, tends to produce the condition in which the chart material will be pulled off the pins B, and in which the portions of the chart which bear sideways against the pins B will be torn.

The condition shown in Fig. 11 is a condition which results from an assembly failure to properly space the non-floating reroll along the reroll axis. As the chart strip is wound on the non-floating reroll shown in Fig. 11, the forces tending to move the chart strip passing over the chart drum A longitudinally of the chart drum axis progressively increase until the chart is pulled off the chart drum pins B.

In Figs. 7, 8, and 9 I have illustrated a desirable combination of the floating reroll with means for automatically rewinding strip material previously wound on the reroll and then manually pulled off the reroll to permit inspection of the corresponding portion of the record traced on the chart. As shown in Figs. 7, 8, and 9, a spring N in the form of a sheet metal strip spiral surrounding the reroll spindle $I^2$ and having its inner end positively connected to said spindle, has its outer end portion bent to form a spring end portion N' extending radially away from the axis of the spindle $I^2$. The end portion N' is in position to engage a pawl O supported by the side frame $D^2$ once during each rotation of the reroll in normal operation. The pawl O is mounted on a pivot pin or shaft P to oscillate about the axis of the latter. The pivot pin P is supported by a bracket or connecting part 2 attached to the side frame D' and arranged to hold the pivot pin P radial to the axis of the spindle $I^2$.

The pawl O is shaped and mounted so that it may turn between its positions shown in dotted and full lines in Fig. 8. When the pawl O is in its dotted line position, the heel or shoulder portion O' of the pawl engages the side frame D and prevents further turning movement of the pawl about the pivot pin P in a counter-clockwise direction as seen in Fig. 8. The free end of the pawl is then in a position to engage the end portion N' of the spring N and prevent that end spring portion from sharing rotative movement given to the inner end of the spring when the knob $I^3$ is manually rotated in the direction to unwind more or less of the chart material previously wound on the reroll I.

When the outer end N' is thus prevented from sharing the unwinding movement of the inner end of the spring, the spring N is put under tension effective to automatically rewind on the reroll all or most of the material unwound from the roll by the knob $I^3$, when the latter is released to permit such rewinding movement of the reroll. If the automatic rewinding action of the spring N is insufficient to take up all the slack in the portion of the chart strip between the chart drum A and the reroll, the latter may be manually rotated by the knob $I^3$ in the normal winding direction to thereby take up the remainder of the slack.

In regular operation the spring N' periodically engages the cam O and moves the latter in the clockwise direction, as seen in Fig. 8, into its full line position in which the spring end N' may move past the pawl O. The pawl O may be spring biased for movement from its full line position into its dotted line position shown in Fig. 8 in any suitable manner, as by means of a helical bias spring R coiled around the pivot P and having one end held stationary and having its other end connected to the pawl O at a distance from the pin P.

The mechanism shown in Figs. 7, 8, and 9 contributes to the over-all merit of the recording apparatus in which it is included, without interfering with the normal operation of that apparatus.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. Measuring apparatus including chart advancing and reroll mechanism comprising in combination, a chart material supply roll, a rotatable chart drum arranged to draw chart material from the supply roll, a rotatable reroll arranged to wind around itself chart material passing to the reroll from the chart drum, mechanism for rotating the chart drum and reroll during recording operation, and supporting means for the supply roll and reroll arranged to permit each of the two last mentioned rolls to move in the direction of its length in response to chart material tension tending to produce such movement.

2. Measuring apparatus including chart advancing and reroll mechanism comprising in combination, a supply roll on which is wound strip chart material having a row of perforations adjacent each edge, a rotatable chart drum arranged to draw chart material from the supply roll and comprising radial chart driving pins adjacent each end and spaced to enter the perforations in said material, mechanism for rotating said chart drum during recording operation, a reroll arranged to wind about itself chart material passing to the reroll from the chart drum, supporting means for the supply roll and for the reroll arranged to permit longitudinal movements of the two last mentioned rolls in opposite directions in response to a chart material tension tending to produce movement of the reroll in the direction of its length.

3. Measuring apparatus including chart advancing and reroll mechanism comprising in combination, a chart material supply roll, a chart drum arranged to draw chart material from the supply roll, means for rotating said chart drum during recording operation, supporting means for the supply roll arranged to permit the latter to move in the direction of its length in response to a chart material tension tending to produce such movement, and means yieldingly opposing the movement of chart material from the supply roll to the chart drum comprising a resilient element frictionally engaging the supply roll substantially midway between the ends of the latter.

4. Chart advancing apparatus comprising supporting structure and apparatus mounted therein including a chart drum rotatable to advance chart material, a reroll, driving mechanism thereon for rotating the reroll in the direction to wind up the chart material advanced by said drum, normally inoperative means arranged for operation during an occasional temporary inspection period to rotate the reroll in the reverse direction to permit chart material previously wound thereon to be temporarily unwound and to be maintained in said unwound condition until said period ends, and a spring coiled around the axis of said reroll and having one end attached to the latter, and a stop element carried by said supporting structure in position to engage and prevent rotative movement of the second end of said spring when said reroll is being unwound, whereby said spring is put under tension when said material is unwound and is thereby made automatically operative to rotate the reroll in the winding direction when said inspection period is terminated.

5. Measuring apparatus including chart advancing and reroll mechanism, including, a chart drum adapted to advance continuously a strip of chart material, a reroll, means for rotating said chart drum during recording operation, mechanism actuated by said chart drum to rotate said reroll and to wind thereon chart material advanced by said chart drum, said mechanism comprising, a wheel which is connected to said reroll and rotatable about an axis to thereby rotate the reroll and which includes a row of teeth extending circularly about said axis, a pawl mounted so as to be rotated about said axis by said chart drum and so as to be movable radially of said axis, and a compression spring engaging said pawl so as to hold it in yielding driving engagement with said wheel between one pair of teeth on said wheel, said pawl thereby rotating said wheel, when the tension of the chart material passing from said chart drum to the reroll is relatively low, and said spring permitting said pawl to be moved by said tooth, when said tension increases to a predetermined value, from between said one pair of teeth on said wheel and into driving engagement with said wheel between another pair of teeth on said wheel.

References Cited in the file of this patent

UNITED STATES PATENTS

| Number | Name | Date |
|---|---|---|
| 1,067,034 | Keller | July 8, 1913 |
| 1,391,601 | Zanon | Sept. 20, 1921 |
| 1,819,712 | Kirkbride | Aug. 18, 1931 |
| 2,059,879 | La Pierre | Nov. 3, 1936 |
| 2,131,346 | Fairchild | Sept. 27, 1938 |
| 2,220,249 | Kropp | Nov. 5, 1940 |
| 2,321,273 | Belcher | June 8, 1943 |
| 2,487,843 | Barnes | Nov. 15, 1949 |